Patented July 27, 1943

2,325,344

UNITED STATES PATENT OFFICE 2,325,344

UNSYMMETRICAL DERIVATIVES OF 4,4'-DI-AMINO-DIPHENYL SULPHONE

Horace A. Shonle and Arthur M. Van Arendonk, Indianapolis, Ind., assignors to Eli Lilly and Company, Indianapolis, Ind., a corporation of Indiana No Drawing. Application November 2, 1940, Serial No. 364,034

4 Claims. (Cl. 260—397.6)

Our invention relates to certain therapeutically effective unsymmetrically substituted 4,4'-diacylaminodiphenyl sulphones, and to the process of producing them.

Our new compounds may be represented by the following formula:

(1) 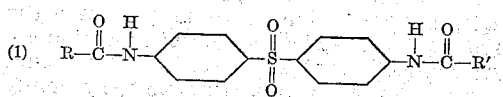

in which R and R' are different, and each of them is a member of the class consisting of methyl, ethyl, and propyl.

The following are examples of our invention:

EXAMPLE 1.—*4-acetylamino-4'-propionylamino-diphenyl sulphone*

To prepare this we may start with the monosubstituted 4-acetylamino-4'-propionylaminodiphenyl sulphone, which is known. We dissolve 2.9 grams (about 0.010 mol) of this in about 20 cc. of pyridine, at room temperature, and add dropwise with stirring about 1 gram (about 0.011 mol) of propionyl chloride. The solution becomes warm during stirring. The solution is then heated for about a half-hour at about 80° C. It is then poured into about 100 cc. of water, desirably cold water, whereupon a precipitate forms. The mixture is then made acid to litmus, as with hydrochloric acid. The acid mixture is then desirably cooled in a refrigerator, to assist complete precipitation. The precipitate, which is commonly crystalline, is then suitably separated from the supernatant liquid, as by filtration. The separated precipitate, which may be dried although that is not necessary, is then dissolved in a minimum amount of boiling ethyl alcohol, and the hot solution is treated with decolorizing carbon and filtered while hot and then cooled, conveniently to about 0° C., whereupon the desired 4-acetylamino-4'-propionylaminodiphenyl sulphone crystallizes out.

This product may not yet be entirely pure, however, and so it is desirable to recrystallize it from ethyl alcohol one or more times. Before the recrystallization we deem it desirable, although it is not necessary, to extract the crude product with dilute hydrochloric acid, of about 10% concentration, to remove any unreacted monosubstituted 4-acetylamino-4'-aminodiphenyl sulphone v may be present.

The final product obtained has the following formula:

(2) 

It is a white crystalline substance, soluble in methyl and ethyl alcohol, insoluble in water, ether, and cold benzene; and its melting point is about 221-222° C., uncorrected.

This product is effective therapeutically in combating streptococcic and pneumococcic infections when administered orally or intraperitoneally.

EXAMPLE 2.—*4-acetylamino-4'-butyrylaminodiphenyl sulphone*

We may prepare 4-acetylamino-4'-butyrylaminodiphenyl sulphone in the same general manner as set forth in Example 1, save that instead of using the propionyl chloride of Example 1 we use butyryl chloride, in the proportion of about 0.011 mol to 0.010 mol of the 4-acetylamino-4'-aminodiphenyl sulphone. In this way we obtain 4-acetylamino-4'-butyrylaminodiphenyl sulphone; which is a white crystalline solid, soluble in methyl or ethyl alcohol, insoluble in water, and insoluble or only slightly soluble in ether and benzene, and of which the approximate melting point, uncorrected, is 223–224° C.

EXAMPLE 3.—*4-propionylamino-4'-butyrylaminodiphenyl sulphone*

In both of the foregoing Examples 1 and 2 the

group of Formula 1 has been the acetyl group, so that we could start with the known 4-acetylamino-4'-aminodiphenyl sulphone and obtain the desired final unsymmetrically substituted 4,4'-diacylaminodiphenyl sulphone by only a single reaction. However, when the

group is to be the propionyl group instead of the acetyl group in the final product, we must prepare the intermediate monosubstituted 4-propionylamino-4'-aminodiphenyl sulphone.

To prepare 4-propionylamino-4'-aminodiphenylsulphone, we dissolve 30 grams (about 0.12 mol) of 4,4'-diaminodiphenyl sulphone in about 200 cc. of boiling dioxane. To the boiling dioxane solution is added dropwise with stirring about 13 grams (about 0.10 mol) of propionic anhydride. The boiling of the solution is continued for a few moments after the addition of the propionic anhydride is completed; and then, desirably after being allowed to cool to about room temperature, the solution is mixed with a large volume of cold water, conveniently about 1.5 liters, whereupon a precipitate forms. The mixture is desirably cooled in a refrigerator, to be certain that the precipitation is complete and that the precipitate is completely crystalline. The crystalline precipitate is then suitably separated from the supernatant liquid, as by filtration. This separated precipitate contains at least three compounds, which are the unreacted 4,4'-diaminodiphenyl sulphone, the monosubstituted 4-propionylamino-4'-aminodiphenyl sulphone, and the symmetrically disubstituted 4,4'-dipropionylaminodiphenyl sulphone. This separated composite precipitate, which may be dried although that is not necessary, is then thoroughly mixed with about a liter of approximately 10% aqueous hydrochloric acid, and the mixture is then allowed to stand at room temperature for an hour or two. If desired, instead of pouring the cool dioxane solution into cold water to form a composite precipitate, we may pour it directly into the dilute (approximately 10%) aqueous hydrochloric acid; and in this case we prefer first to evaporate off a large part (say about half) of the dioxane, desirably under vacuum, in order to reduce the volume of the final solution obtained. The aqueous hydrochloric acid will dissolve, or hold in solution as the case may be, substantially all of the original unreacted 4,4'-diaminodiphenyl sulphone and substantially all of the monosubstituted 4-propionylamino-4'-aminodiphenyl sulphone; and will leave undissolved, or precipitate as the case may be, the symmetrically disubstituted 4,4'-dipropionylaminodiphenyl sulphone. The supernatant liquid and the solid are suitably separated, as by filtration. The unreacted and the monosubstituted sulphones in the filtrate may be separated from each other with more or less completeness in several ways. One way is to precipitate them together from the aqueous hydrochloric acid solution by the addition of sufficient ammonium hydroxide or sodium hydroxide or other alkalinizing reagent to produce substantially complete precipitation, and then separating the component parts of the precipitate by repeated fractional crystallization from a suitable solvent, such as ethyl or methyl alcohol. A simpler method of separating the two components, however, is to add ammonium hydroxide (or sodium hydroxide) very slowly to the aqueous hydrochloric acid solution, until a cloudiness appears in the solution, which has become warm on the addition of the hydroxide, and then cooling to cause a precipitation, and then separating the precipitate from the supernatant liquid, as by filtration; and then repeating that process on the remaining liquid by further slow addition of ammonium hydroxide or sodium hydroxide until cloudiness again appears, and cooling the solution (which has become warm) to produce a second precipitate, and separating that precipitate; and repeating that process to get a series of precipitations. The first precipitate obtained, and sometimes the second obtained, is almost wholly the monosubstituted 4-propionylamino-4'-aminodiphenyl sulphone; but as the series of precipitations continues the precipitates obtained become decreasingly that monosubstituted sulphone, and increasingly the unreacted 4,4'-diaminodiphenyl sulphone. The several precipitates may be purified to obtain the desired monosubstituted 4-propionylamino-4'-aminodiphenyl sulphone free from the unreacted 4,4'-diaminodiphenyl sulphone by recrystallization from a suitable solvent, such as methyl or ethyl alcohol.

This mono-substituted 4-propionylamino-4'-aminodiphenyl sulphone is a white crystalline substance, soluble in hot methyl or ethyl alcohol but almost insoluble in cold methyl or ethyl alcohol, and insoluble in water, in ether, and in cold benzene; and its melting point is about 200–201° C., uncorrected. It is represented by the following formula:

(3) 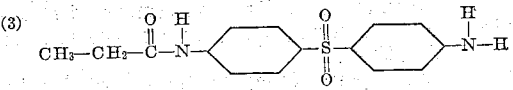

From this monosubstituted 4-propionylamino-4'-aminodiphenyl sulphone we may prepare the desired unsymmetrical 4-propionylamino-4'-butyrylaminodiphenyl sulphone by a procedure similar to that set forth in Example 1; by simply using a molecular proportion of that monosubstituted 4-propionylamino-4'-aminodiphenyl sulphone in place of the amount specified in Example 1 of 4-acetylamino-4'-aminodiphenyl sulphone, and using a molecular proportion of butyryl chloride or butyryl bromide or butyric anhydride instead of the propionyl chloride of Example 1. The 4-propionylamino-4'-butyrylaminodiphenyl sulphone thus obtained has a melting point of about 201–202° C., uncorrected; and is a white crystalline solid, soluble in methyl or ethyl alcohol, and insoluble or nearly insoluble in water, ether, and cold benzene.

The products of Examples 2 and 3, like that of Example 1, are useful in combating streptococcic and pneumococcic infections, and may be administered orally or intraperitoneally. When any of the compounds of this invention are administered intraperitoneally, it is most convenient to administer them in acacia suspensions.

We claim as our invention:
1. 4-acetylamino-4'-propionylaminodiphenyl sulphone.
2. 4-acetylamino-4'-butyrylaminodiphenyl sulphone.
3. 4-propionylamino-4'-butyrylaminodiphenyl sulphone.
4. A 4-R-amino-4'-R'-aminodiphenyl sulphone in which R and R' are different, and each of them is an acyl group in which the number of carbon atoms is between 2 and 4 inclusive.

HORACE A. SHONLE.
ARTHUR M. VAN ARENDONK.

Certificate of Correction

Patent No. 2,325,344.   July 27, 1943.

HORACE A. SHONLE, ET AL.

It is hereby certified that errors appear in the printed specification of the above numbered patent requiring correction as follows: Page 1, first column, lines 20 and 21, for "4-acetylamino-4'-propionylaminodiphenyl" read *4-acetylamino-4'-aminodiphenyl*; and second column, line 5, for that portion of the formula reading $$CH_3-\overset{O}{\overset{\|}{C}}-\overset{N}{N}- \quad \text{read} \quad CH_3-\overset{O}{\overset{\|}{C}}-\overset{H}{N}-$$

and that the said Letters Patent should be read with these corrections therein that the same may conform to the record of the case in the Patent Office.

Signed and sealed this 16th day of November, A. D. 1943.

[SEAL]

HENRY VAN ARSDALE,
*Acting Commissioner of Patents.*